United States Patent
Loh

(10) Patent No.: US 10,628,124 B2
(45) Date of Patent: Apr. 21, 2020

(54) STOCHASTIC ROUNDING LOGIC

(71) Applicant: Advanced Micro Devices, Inc., Santa Clara, CA (US)

(72) Inventor: Gabriel H. Loh, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/933,229

(22) Filed: Mar. 22, 2018

(65) Prior Publication Data

US 2019/0294412 A1  Sep. 26, 2019

(51) Int. Cl.
*G06F 7/499* (2006.01)
*G06F 7/58* (2006.01)
*G06N 20/00* (2019.01)

(52) U.S. Cl.
CPC .......... *G06F 7/49947* (2013.01); *G06F 7/588* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,974,435 A | * | 10/1999 | Abbott | G06F 7/5324 708/523 |
| 8,019,805 B1 | | 9/2011 | Sarma | |
| 10,255,041 B2 | * | 4/2019 | Rarick | G06F 7/487 |
| 2004/0078401 A1 | | 4/2004 | Hilton | |
| 2005/0165875 A1 | * | 7/2005 | Mukaida | G06F 7/728 708/492 |
| 2017/0060532 A1 | * | 3/2017 | Ahmed | G06F 7/483 |
| 2017/0192752 A1 | * | 7/2017 | Bradbury | G06F 7/588 |
| 2017/0220342 A1 | | 8/2017 | Bradbury et al. | |

OTHER PUBLICATIONS

Gupta, et al., "Deep Learning with Limited Numerical Precision" 32nd International Conference on Machine Learning, dated Jun. 30, 2015, pp. 1737-1746.
European Patent Office, "Search Report" in application No. PCT/US2019/022685, dated Jun. 5, 2019, 13 pages.
European Claims in application No. PCT/US2019/022685, dated Jun. 2019, 4 pages.

* cited by examiner

*Primary Examiner* — Michael D. Yaary
(74) *Attorney, Agent, or Firm* — Hickman Palermo Becker Bingham LLP

(57) ABSTRACT

Techniques and circuits are provided for stochastic rounding. In an embodiment, a circuit includes carry-save adder (CSA) logic having three or more CSA inputs, a CSA sum output, and a CSA carry output. One of the three or more CSA inputs is presented with a random number value, while other CSA inputs are presented with input values to be summed. The circuit further includes adder logic having adder inputs and a sum output. The CSA carry output of the CSA logic is coupled with one of the adder inputs of the adder logic, and the CSA sum output of the CSA logic is coupled with another input of the adder inputs of the adder logic. A particular number of most significant bits of the sum output of the adder logic represent a stochastically rounded sum of the input values.

21 Claims, 8 Drawing Sheets

STOCHASTIC ROUNDING LOGIC

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

With the growth of artificial intelligence, machine learning technologies have found their way into wide variety of applications. Training a machine learning model is generally very resource intensive and thus, usually requires dedicated computer systems to perform. However, with the expansion in applications of machine learning, there is a growing need for training of machine learning models to be performed in a shared computing resource environment without sacrificing accuracy.

To improve performance, reduced-precision numerical representations may be used in training machine learning models. For example, the weights in neural networks may have reduced-precision format, and thus require less computational resources for processing. However, some operations may still (albeit temporarily) produce wider-precision numerical representations.

One way to reduce wider-precision numerical representations back to reduced-precision ones, is to simply truncate the wider-precision numerical representations. Truncation of extra bits is trivial to implement (and usually the default), but can lead to training errors/lower accuracy by systematically biasing values (such as weights) in one direction.

To utilize reduced-precision numerical representations without sacrificing accuracy, stochastic rounding is performed instead of trivial truncation. The stochastic rounding of wider-precision numerical representations avoids introducing a bias and therefore, improves the accuracy of the resultant machine learning models. For example, stochastic rounding on a wider-precision decimal rounds the value up or down with a probability proportional to the least-significant decimals that are to be dropped from the wider-precision decimal. Accordingly, the value of 37.25 would be rounded up to 38 with a 25% probability, and rounded down to 37 with a 75% probability.

One approach for implementing stochastic rounding is by executing multiple instructions that yield the result of the rounding. The software program may contain the appropriate command(s) for stochastic rounding, which during the compilation of such a program, would yield multiple instructions to be executed by a hardware processor. The multiple instructions incur high overhead when processed: multiple processor cycles, potential multiple memory look-ups, and pipeline stalls, among others.

DETAILED DESCRIPTION

Figure 1:
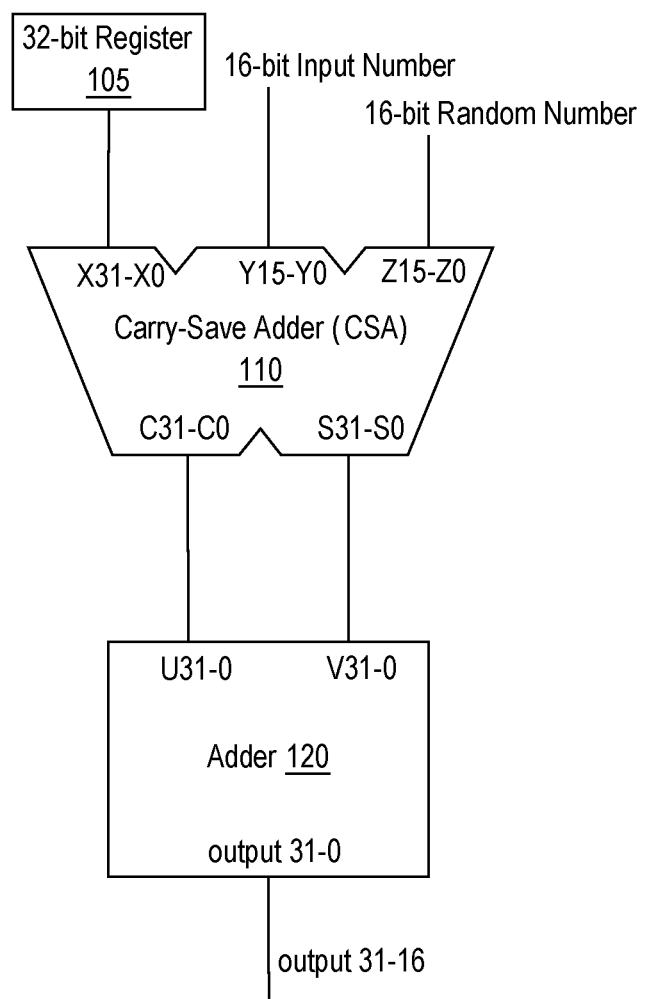
FIG. 1 is a block diagram that depicts an example circuit for summation with stochastic rounding, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

To achieve greater code density, higher performance, higher processor utilization and lower power, various circuits and techniques are described herein to perform stochastic rounding. In an embodiment, a random number is generated and added to the summation of two or more numbers to generate a stochastically rounded sum of the two or more numbers.

For example, suppose that a sample sum of two or more number is 37.25. When stochastically rounding such a sum, the result is 37 with 75% probability and is 38 with 25% probability. When a random number is generated in the range from 0 to 1 (1 not included), the random number has a 75% probability of being in the range from 0 to 0.75 (0.75 not included) and a 25% probability of being in the range from 0.75 to 1 (1 not included). Thus, adding such a random number to the sum of 37.25 yields, 75% of the time, a result that starts with 37 (the result is in the range of 37.25 to 38.0 (38.0 not included)), and 25% of the time, a result that starts with 38 (the result is in the range 38.0 to 38.25 (38.25 not included)).

Accordingly, to calculate a lower-precision sum of a stochastically rounded wider-precision sum, in addition to summing addends that may yield a wider-precision sum, a random number is generated and added, in embodiment. The random number is added at the same time as the other addends. The randomly-generated number has the same width as the difference between the desired lower-precision width and the higher precision width. The stochastically rounded sum is generated by retrieving the lower-precision width of the most significant digits and discarding the rest of the result. For example, if the wider width sum is 32 bits while the stochastically rounded lower-width sum is 8 bits, a random number of 32−8=24 bits is generated as an additional addend to the summation. After the summation, the 8 most significant bits of 32 bit-sum are read as the stochastically rounded 8-bit width sum.

In an embodiment, carry-save adder (CSA) logic is used to add a random number value to presented input values to generate a stochastically rounded sum of input values. The term "carry-save adder (CSA) logic" refers to a circuit that has three or more inputs and produces a carry output and a carry-less partial sum output. The carry-less partial sum output is the sum of all the inputs, without considering carry values generated while adding the corresponding digits. The unaccounted carry values for the corresponding digits are aggregated as the carry output of the CSA logic. A carry-save adder is an example of CSA logic. Although, the circuits and techniques described herein may refer to a binary carry-save adder for purposes of explanation, any other CSA logic may be effectively substituted. Therefore, such circuits and techniques should not be interpreted as being limited to carry-save adders, and may be implemented by any CSA logic.

CSA logic is coupled to adder logic to generate the full sum of input values. The term "adder logic" refers to a circuit that has two or more inputs and produces a full sum of the values presented at the two or more inputs (including any generated carries). Although, the circuits and techniques described herein may refer to a carry completing adder for purposes of explanation, as the adder logic, such circuits and techniques should not be interpreted as being limited to full adders but rather to any adder logic. Non-limiting examples of a full adder are a ripple-carry adder and a carry-lookahead adder.

The carry output and partial sum output are presented as inputs for the adder logic. A number of most significant bits of the adder logic represent a stochastically rounded sum of the two or more inputs of the CSA logic.

FIG. 1 is a block diagram that depicts an example circuit for summation with stochastic rounding, in an embodiment. The example circuit includes accumulator register 105, CSA 110 and full adder 120. CSA 110 has three inputs, X31-X0, Y15-Y0, and Z15-Z0.

The binary numbers presented at each of those inputs are summed by CSA 110 and full adder 120. The CSA 110's carry output, C31-0, is coupled with full adder 120's inputs U31-U0, and the CSA 110's partial sum output, S31-S0, is coupled with full adder 120's inputs V31-V0, respectively.

CSA 110 is configured to perform a partial summation (carry-less summation) of corresponding bits of inputs X31-X0, Y15-Y0 and Z15-Z0. The partial sum is provided at output S31-S0. Aggregation of carries for each corresponding input bits' addition is provided at output C31-C0. Full adder 120 performs carry-complete addition of binary values presented at inputs U31-U0 and V31-V0. The full sum generated by adder 120 is provided at output 31-0.

In this example, CSA inputs X31-X0 are coupled to accumulator register 105. Accordingly, the number stored in accumulator register 105 is presented as an input to CSA 110 at inputs X31-X0. The accumulated number is added to a 16-bit input number that is presented at CSA 110 inputs Y15-Y0. The other input to CSA 110 is a 16-bit random number, which is presented at CSA 110 inputs Z15-Z0.

Since the random number input in this example is 16-bit input, the lower 16 bits of full adder 120, output 15-0, are discarded. The output of the remaining bits, output 31-16, is the stochastically rounded sum of the input number and the number stored in register 105.

Random Number Register

In an embodiment, the random number is generated by a linear-feedback shift register. In such an embodiment, the linear-feedback shift register is coupled to the random number input of CSA logic. The linear-feedback shift register may be of any bit-length and generate a pseudo random number of such a bit length.

In another embodiment, a register is coupled to the random number input of CSA logic. The random number is generated and stored in the register, prior to computing the stochastic rounding of a sum.

Optimizations to Stochastic Rounding Circuit

In an embodiment, a CSA logic is optimized for one or more input bits for which no random number input is presented. In such an embodiment, the random number presented at a CSA logic input has less bit-width than at least one other input to the CSA logic. Circuit components of a CSA logic that have no random number input (or are otherwise always set to a zero-value for the random number input) may be eliminated or optimized. Doing so improves the density, power consumption, and performance of the circuit.

In an embodiment, an input of the CSA logic is an accumulated input. An accumulated input is wider than the other inputs of the CSA logic because at the accumulated input, an intermediate result of a previous operation is presented. The previous operation may have resulted in additional bit(s), which are accommodated by the wider-width accumulated input. For example, the accumulated input may be coupled to an accumulator register that is wider in width and into which the intermediate result of previous operations is stored.

Accordingly, the non-accumulated input of a CSA logic has less bit-width than at least the accumulated logic of the CSA logic. Circuit components of a CSA logic that have no non-accumulated number input (or are otherwise always set to a zero-value for the non-accumulated input) are eliminated or optimized similar to the components without random number inputs, in an embodiment.

Figure 2:
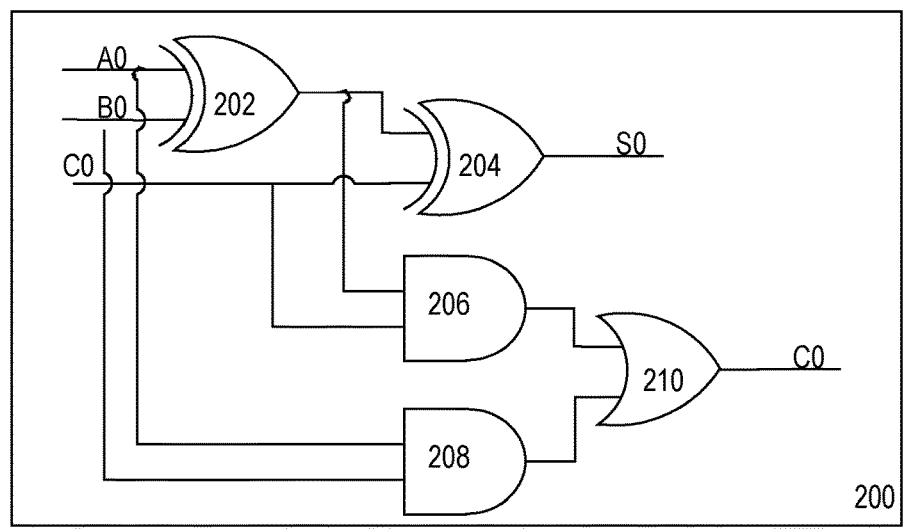
FIG. 2 is a block diagram that depicts example circuits of carry-save adder (CSA) logic components, in an embodiment.
Figure 2:
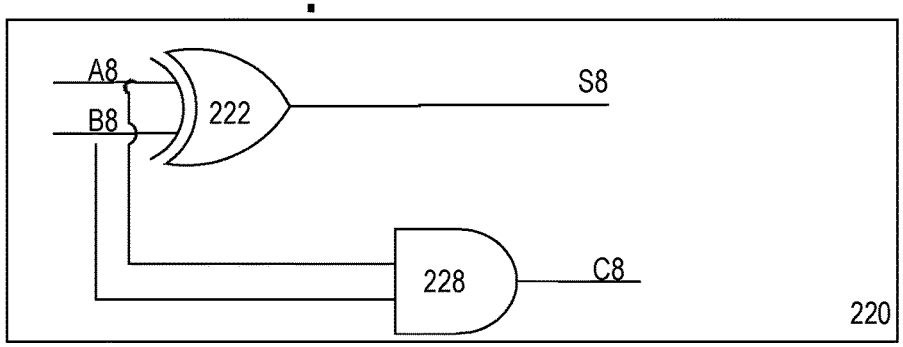
Figure 2:
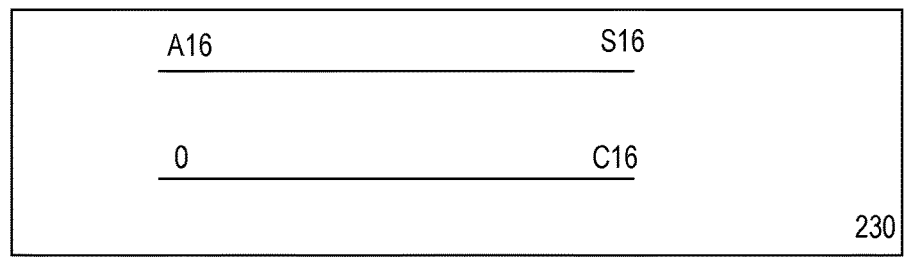

FIG. 2 is a block diagram that depicts example circuits of CSA logic components, in an embodiment. In this example, an accumulated input of the CSA logic is a 32-bit input, a non-accumulated input is a 16-bit input, and a random number input is an 8-bit input. Circuit 200 is a sample logic circuit that yields the least significant bit of a carry output, C0, and the least significant bit of a partial sum output, S0. The output is produced by presenting the least significant bit of the accumulated input at input A0, the least significant bit of the non-accumulated input at input B0, and the least significant bit of the random number input at input C0.

Circuit 220 is a sample logic that yields the eighth bit of a carry output, C8, and the eighth bit of a partial sum output, S8. Rather than using a circuit logic as one depicted for the least significant bits, circuit 200, circuit 220 is optimized. The optimization is due to the lack of random number input, C, because the random number input is lower-width input of 8-bits and thus has meaningful inputs only from bits 0 to 7. Because of the lack of the random number input, equivalent logic gates of 204, 208 and 210 of circuit 200 are eliminated in circuit 220. Logic gate 222, equivalent to logic gate 202 in circuit 200, and logic gate 228, equivalent to logic gate 208 in circuit 200, are used to produce the eighth-bit partial sum, S8, and the eighth-bit carry output, C8.

Circuit 230 is a further optimization of circuit 220 based on the lack of both the random number input and non-accumulated number input starting at the $16^{th}$-bit input of the sample CSA logic. With the further optimization, no logic gates are used to produce the carry output and partial sum output for the bits 16 through 31.

Accumulating Stream(s) of Input Numbers

In an embodiment, the partial sum output of CSA logic and the carry output of CSA logic are coupled to respective intermediate registers. The intermediate registers themselves are coupled to the input of a full adder and in a feedback path to the at least two inputs of the CSA logic. The remaining input(s) of the CSA logic are presented with respective input stream(s) of numbers to be summed. At each cycle, an input number is partially summed with the previous cycle's partial sum, the carry output is stored in the intermediate registers, and a new partial sum and new carry output are stored in the intermediate registers.

In one embodiment, after the last input number of the input stream is presented, at the next cycle, a random number is presented at the input stream input of the CSA logic. The random number is presented based on multiplexing an output from a register containing the random number or from a linear-feedback shift register. By presenting a random number at the input stream input, the final accumulated carry and partial sum are accumulated together with the random number. A number of the resulting accumulation's most significant bits are the stochastically rounded sum of the presented input stream.

In another embodiment, one of the intermediate registers is initialized to a random number. Thus, at a first cycle of accumulation, the random number is accumulated with the first number of the input stream. Thus, after all the cycles of processing the input stream, most significant bits of the output represent the stochastically rounded sum of the input stream.

Figure 3:
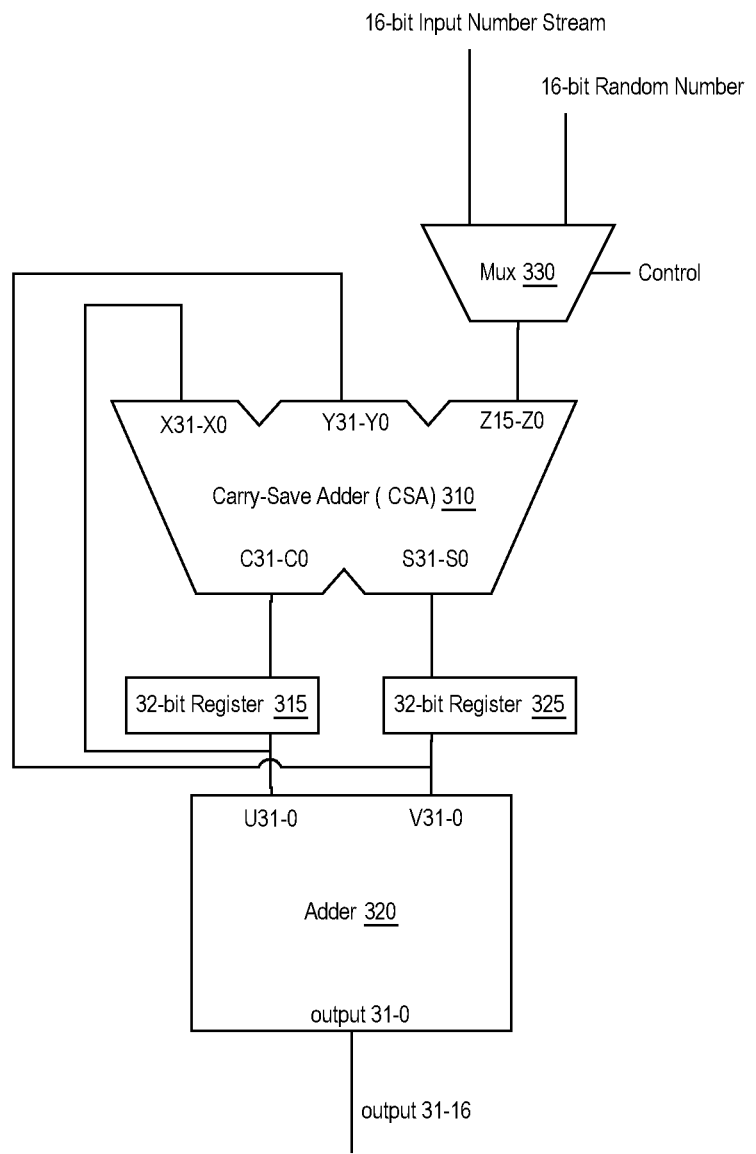
FIG. 3 is a block diagram that depicts a circuit for accumulating a stream of input numbers and stochastically rounding such an accumulation, in an embodiment.

FIG. 3 is a block diagram that depicts a circuit for accumulating a stream of input numbers and stochastically rounding such an accumulation, in an embodiment. The example circuit includes accumulator registers 315 and 325, CSA 310 and full adder 320. CSA 310 has two 32-bit inputs, X31-X0 and Y31-Y0, and one 16-bit input, Z15-Z0.

The binary numbers presented at each of those inputs are summed by CSA 310 and full adder 320. The CSA 310's carry output, C31-C0, is coupled to register 315, which itself is coupled with full adder 320's input U31-U0. The CSA 110's partial sum output, S31-S0, is coupled with register 325, which itself is coupled with full adder 320's input V31-V0, respectively.

Registers 315 and 325 are respectively coupled to input X31-X0 and Y31-Y0, respectively, in a feedback loop in this example. Registers 315 and 325 are initialized to zero.

At each cycle, the 16-bit input number is multiplexed in by multiplexer 330 to be presented at inputs Z15-Z0. CSA 310 evaluates and sums the input number with the previously evaluated carry output and partial sum presented from registers 315 and 325. For example, at the first cycle, register 315 and 325 contain zero, thus the evaluation by CSA 310 results in storing the input number in register 325 as a partial sum output with zero values. Register 315 continues to store zero because adding zero to an input number yields no carry output. In the next cycle, the previous input is presented again at input Y31-0 due to feedback coupling of register 325 with CSA 310. In this cycle, the newly presented input number is accumulated with the previous input number to yield a new partial sum to be stored in register 325 and a carry output of the sum to be stored in register 315. The cycle is repeated until all the input numbers in the input stream are presented at the Z15-0 input of CSA 310.

In the cycle after the last cycle of presenting the last input number in the stream, a control signal for 16-bit multiplexer 330 selects the random number input to be presented at Z15-0 input of CSA 310. The random number is partially summed at CSA 310 with the accumulated carry value and accumulated partial sum value presented from registers 315 and 325 at inputs X31-0 and Y31-0, respectively. The resulting partial sum and the resulting carry output at respective registers 315 and 325 include a random number and are added at full adder 320. The most significant bits 31-16 of full adder 320's output represent the stochastically rounded sum of the input stream, while the rest of the output bits are discarded.

In an embodiment, a circuit simultaneously sums and stochastically rounds the sum of three or more input numbers. The circuit uses CSA logic that includes Wallace tree adder logic. The "Wallace tree adder logic" term refers herein to a circuit that has four or more inputs and produces a carry output and a carry-less partial sum output of input numbers presented at the inputs. A Wallace Tree adder is an example of Wallace tree adder logic. Although, the circuits and techniques described herein may refer to a Wallace tree adder for purposes of explanation, any other Wallace tree adder logic may be effectively substituted. Therefore, such circuits and techniques should not be interpreted as being limited to a Wallace tree adder, but are applicable to any Wallace tree adder logic.

Figure 4:
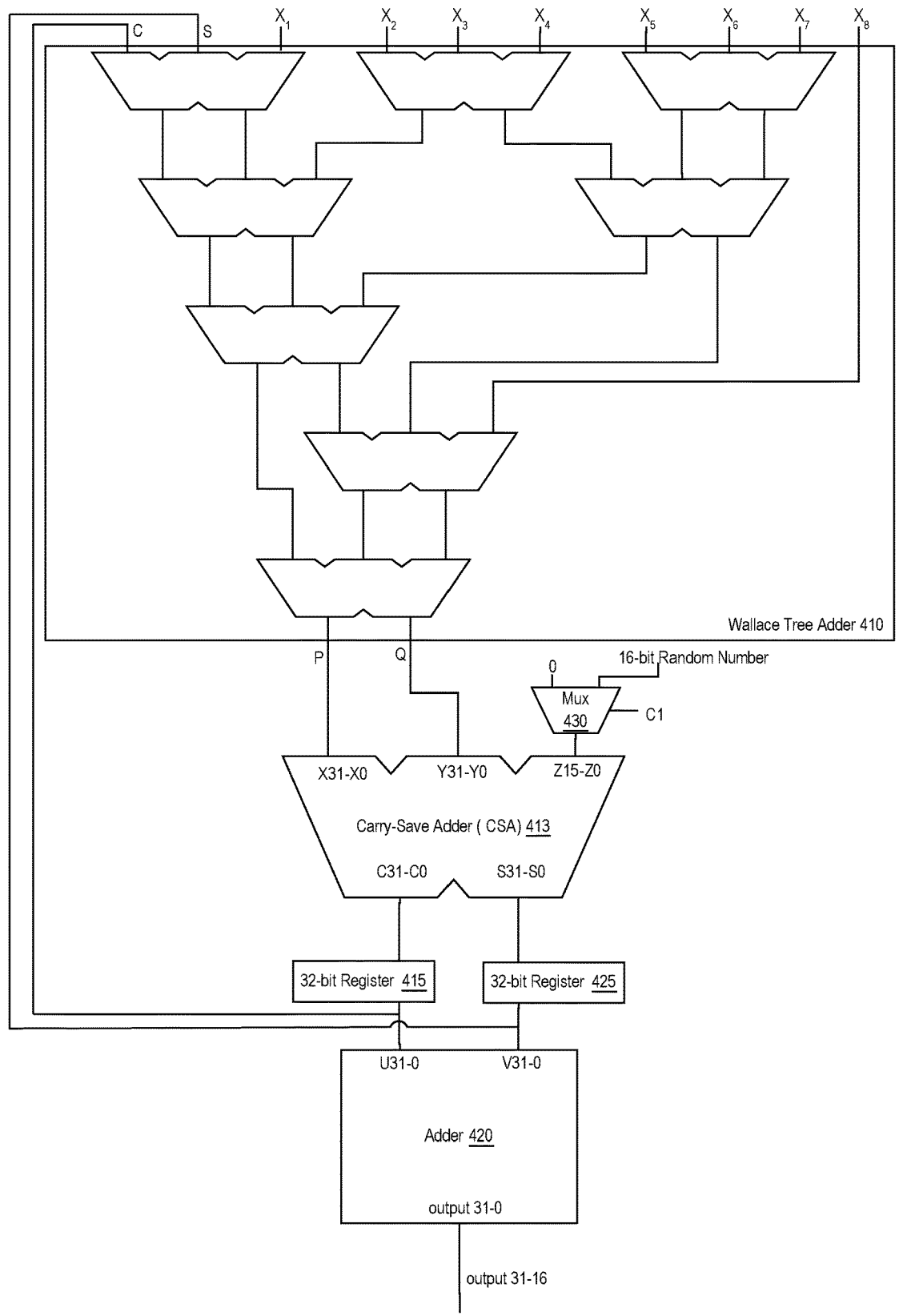
FIG. 4 is a block diagram that depicts a circuit for summing multiple streams of input numbers and stochastically rounding such a summation, in an embodiment.

FIG. 4 is a block diagram that depicts a circuit for summing multiple streams of input numbers and stochastically rounding such a summation, in an embodiment. In this example, the circuit uses a Wallace tree adder. A Wallace tree adder includes a network of coupled CSA adders that simultaneously accumulate multiple input numbers presented at the inputs of the Wallace tree adder to yield an accumulated carry output and an accumulated partial sum output.

Wallace tree adder 410 has ten inputs, two of the inputs, C and S, are coupled to carry output accumulator register 415 and partial sum output accumulator register 425, similar to FIG. 3. Each CSA of Wallace tree adder reduces the number of inputs to one less number of outputs. The output of such a CSA is then coupled to another CSA's input to further lessen the number of outputs, until there are only two outputs, carry output P and partial sum output Q.

Wallace tree adder 410's outputs P and Q are coupled to inputs of CSA 413. The third input of CSA 413 is coupled to multiplexer 430. Based on the control input C1 of multiplexer 430, either a random number input or a zero value is selected to be presented at the input of CSA 413. Presenting a zero value allows for streams of numbers at inputs of $X_1$-$X_8$ to be accumulated at CSA 413's output registers 415 and 425. At the last entries of the streams, mux 430 selects the random number input for a random number to be added to the final accumulation, in one embodiment. In other embodiments, the random number input is selected by mux 430 in any other accumulation cycle.

The outputs of CSA 413 are coupled to carry output register 415 and partial sum output register 425, which themselves are coupled to full adder 420. Full adder 420 evaluates the full addition of the carry output and the partial sum of CSA 413 as accumulated in output registers 415 and 425. Accordingly, full adder 420 yields carry complete results of summations of multiple streams of numbers. At the last cycle, a number of most significant bits of full adder 420's output are the stochastically rounded sum of the input stream of numbers presented at the inputs of Wallace tree adder 410.

Negative Sum Rounding

To stochastically round a negative sum a random number is subtracted (or stated otherwise, a negative random number is added). For example, a sample sum of two or more numbers is −37.25. When stochastically rounding such a negative sum, the result is −37 with a 75% probability and is −38 with a 25% probability. When a random number is generated in the range from −1 to 0 (−1 not included), the random number has a 75% probability to be in the range from −0.75 to 0 (−0.75 not included) and a 25% probability to be from −1 to −0.75 (−1 not included). Thus, adding such a negative random number to the sum of −37.25 yields, 75% of the time, a result starts with −37 (the result is in the range of −38 to −37.25 (−38.0 not included)), and 25% of the time, a result that starts with −38 (the result is in the range −38.25 to −38.0).

In an embodiment, to generate a negative random number, a positive random number is generated (e.g. using the techniques described herein) and then converted to a negative number. In one embodiment, the positive random number is converted to a negative number of the same width by negating each bit of the positive number to yield one's complement negative number. In another embodiment, a positive random number's each bit is negated and then a value of one is added to convert the positive random number to the two's complement of the random number. In yet another embodiment, the most significant bit of a randomly generated positive number is negated to yield a negative random number albeit not equal in absolute value to the positive random number.

In an embodiment, to stochastically round a sum of input numbers, the sum is generated without stochastic rounding and then based on the sign of the sum (positive or negative) a random number is added with or without conversion to a negative random number.

Figure 5:
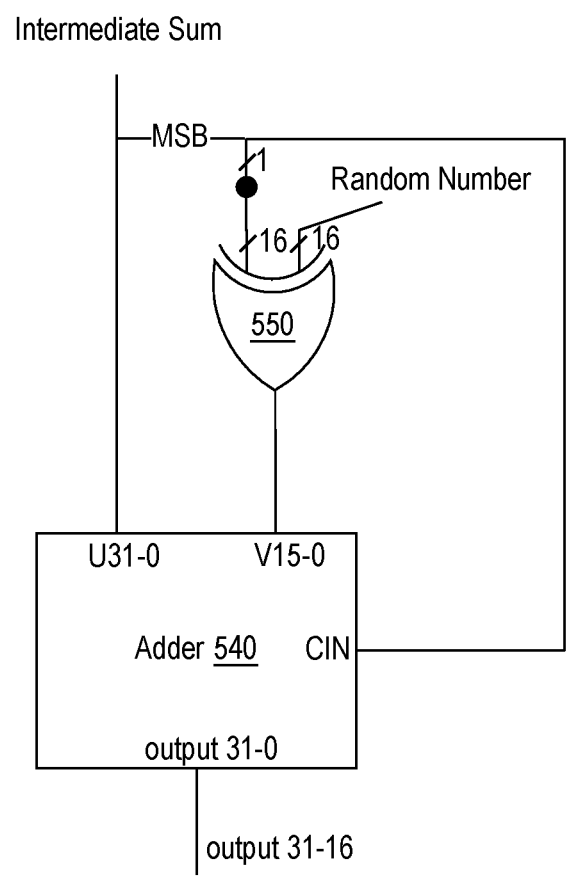
FIG. 5 is a block diagram that depicts a circuit that stochastically rounds a sum based on its sign, in an embodiment.

FIG. 5 is a block diagram that depicts a circuit that stochastically rounds a sum based on its sign, in an embodiment. The sample circuit of FIG. 5 includes full adder 540 and a 16-bit XOR gate 550. A 32-bit sum is an input U31-0 to full adder 540 to generate stochastic rounding of the input sum. Full adder 540 also exposes input CIN for carry-in input to the full adder. The most significant bit of the input sum, U31, is also coupled to each bit of XOR gate 550's 16-bit input. The other 16-bit input of the XOR gate is coupled to a positive random number input. The output of XOR gate 550 is coupled to full adder 540's inputs V15-V0.

Thus, when the input sum's most significant bit, U31, is high, denoting that the sum is a negative number, each of the random number bits are XORed with a value one. Such an XOR operation yields a one's complement of the positive random number. The one's complement random number is then presented as an input to full adder 540 at inputs V15-V0 to be added with the sum at input U31-U0. Additionally, the most significant bit of the sum, U31, is coupled to input CIN of full adder 540, thus adding a value of one to the summation of the sum and the negative random number. Such an addition, effectively makes the negative random number a two's complement of the presented positive random number. A number of most significant bits of the result from the output of full adder 540, such as output 31-16 are selected as the stochastically rounded negative sum.

In case the input sum is a positive number, then the 16-bit input of XOR gate 550 has a zero value. Thus, the XOR operation at XOR gate 550 yields the same value as presented at the random number input. Similarly, input CIN has a zero value, thus no additional value is added at full adder 540. Thus, the output of full adder 540 is a summation of the input sum and the unchanged positive random number.

In an embodiment, a circuit for stochastic rounding of sum includes two sub-circuits for stochastic rounding of sums, the two sub-circuits being different in the sign of the random number input. One sub-circuit has a positive random number at the random number input, the other has a negative random number at the random number input. After the stochastic rounded sum is calculated using both sub-circuits, one or both of the most significant bits of the respective results are used to select which of the two stochastic rounded sum results to select as the output result of the circuit. For example, if the most significant bit of the result of the positive random number sub-circuit is positive then the result is selected as the output of the circuit. If the result of the positive random number sub-circuit is negative then the result of the negative random number sub-circuit is used.

Figure 6:
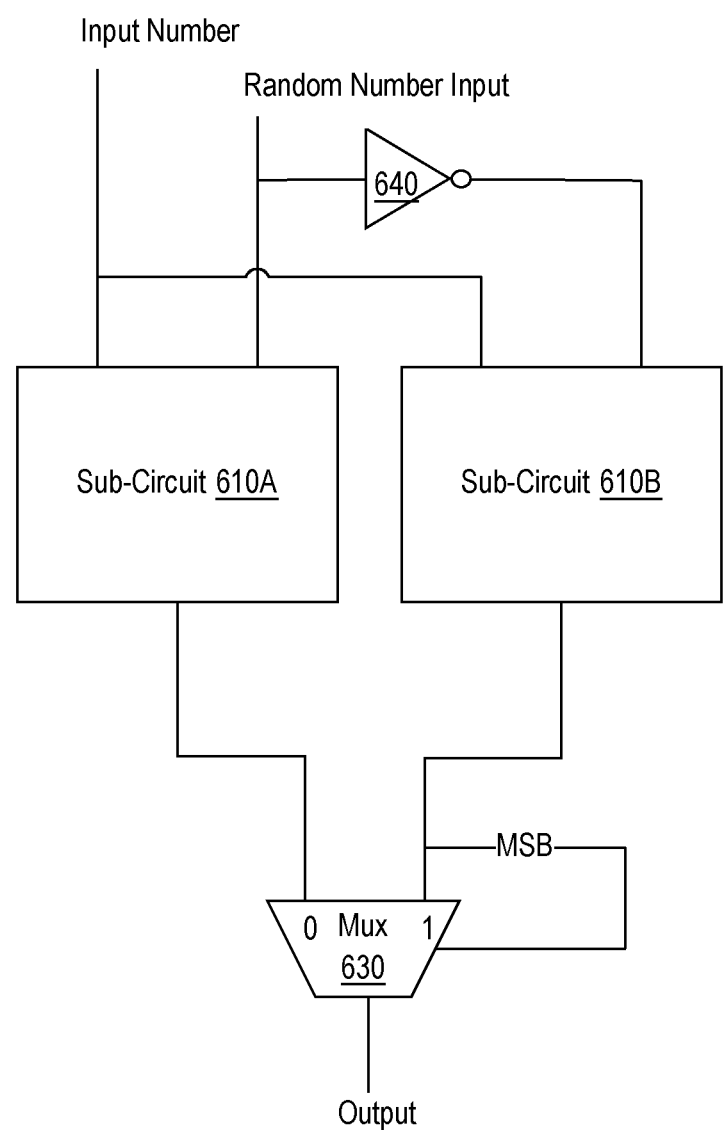
FIG. 6 is a block diagram depicting an example circuit for stochastic rounding of a signed summation, in an embodiment.

FIG. 6 is a block diagram depicting an example circuit for stochastic rounding of a signed summation, in an embodiment. The example circuit includes sub-circuits 610A and 610B. Sub-circuits 610A and B have the same circuit that sums input numbers and presents a stochastically rounded number. Sub-circuits 610A and B may include any of the circuits discussed herein. The input numbers presented as an input to sub-circuits 610A and B are the same. However, the random number input is inverted for sub-circuit B by inverter 640. Inverter 640 is coupled to only most significant bit of the random number input. Such an inversion (complete or most significant bit (MSB) only), converts a positive random number presented at the random number input into a different negative, yet still random, number.

The signs of outputs of sub-circuits 610A and 610B (represented by the most significant bits (MSBs) of the respective outputs), determine which of sub-circuit's output reflects the correct stochastic rounding. For example, multiplexer 630 is coupled to the most significant bits of sub-circuit 610B. The multiplexer 630 selects the sub-circuit 610A's output when the sub-circuits 610B's sign is negative and selects the sub-circuit 610B's output when the sub-circuits 610B's sign is positive.

Functional Overview

Figure 7:
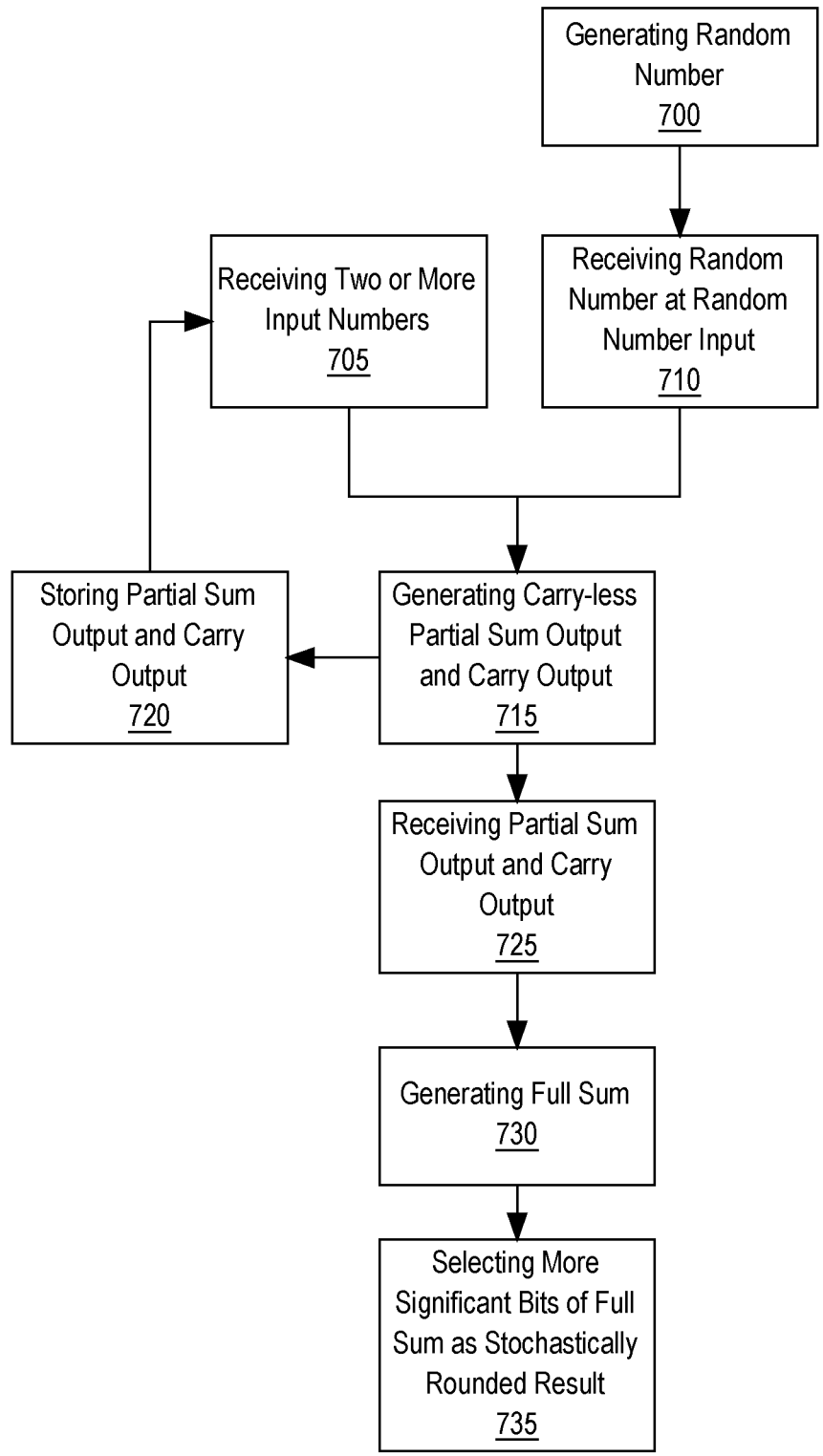
FIG. 7 is a flowchart depicting a process for stochastically rounding a sum of two or more numbers, in an embodiment.

FIG. 7 is a flowchart depicting a process for stochastically rounding a sum of two or more numbers, in an embodiment. At step 705, two or more input numbers are received for summation. At step 710, a random number is received for stochastic rounding. Although the process as depicted in FIG. 7 may be performed iteratively, the random number is received at step 710 during a single iteration rather than at every iteration of the process. This ensures that the random number is added only once during an iterative accumulation. The random number may be generated by a linear-feedback shift register or any other methodology at step 700.

At step 715 a half addition is performed on the input numbers and the random number. The digits are summed without propagating any carry to generate a partial sum output, and the generated carries are aggregated as a separate carry output. Steps 705-715 are performed by one or more carry-save adders, in an embodiment.

The partial sum and the carry output may be stored at step 720 and provided as feedback as input numbers at step 705. Such a feedback generates accumulative partial summation of one or more input streams of numbers.

At step 725, the carry output and the partial sum are received, and at step 730, a full addition (including carry propagation) of the partial sum output and the carry output is performed generating full addition of input number(s) and random number as an output. Steps 725-730 are performed by an adder logic, in an embodiment.

At step 735, a number of most significant bits of the full sum output are selected as a stochastically rounded result of the summation of the two or more numbers. The selected number of significant bits depends on the number of bits used for the random number.

Figure 8:
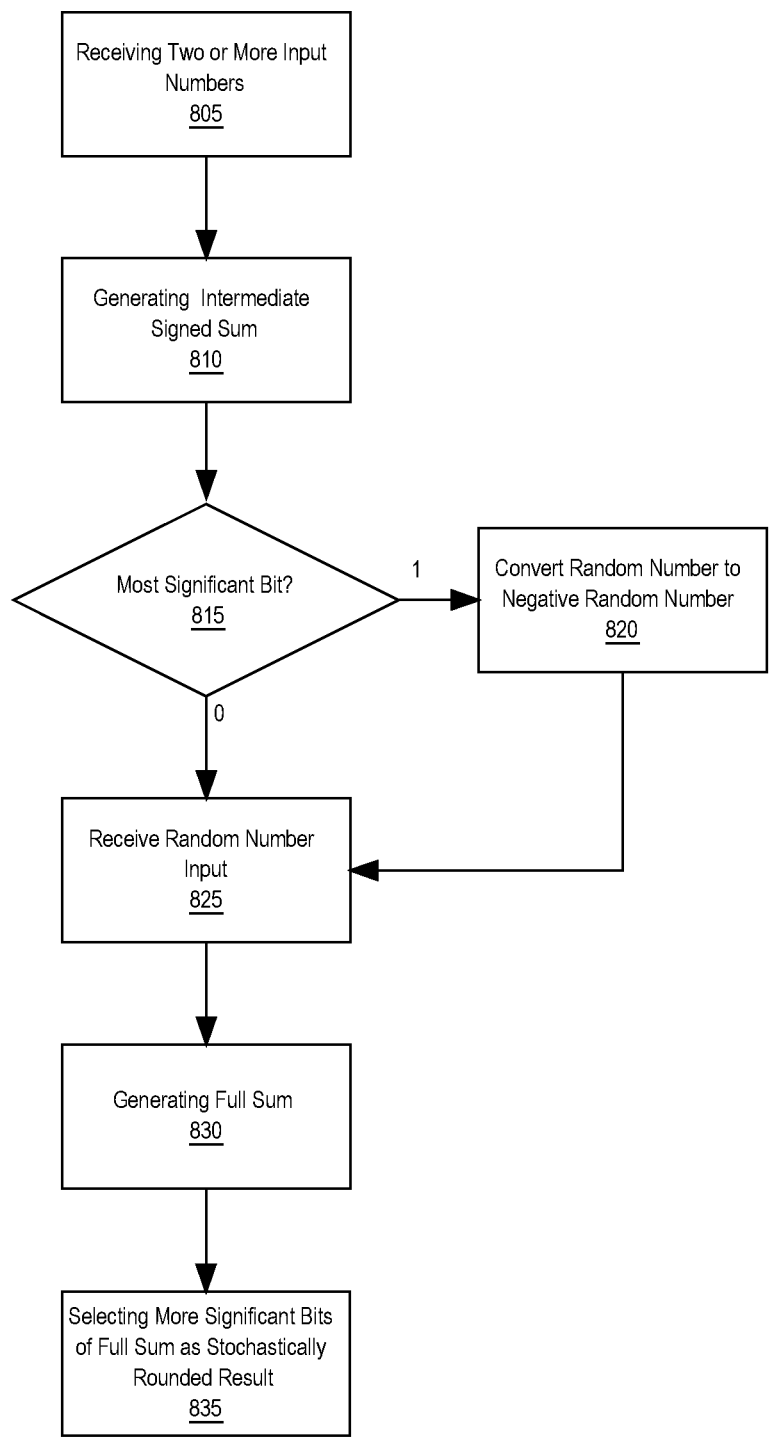
FIG. 8 is a flowchart depicting a process for stochastically rounding a signed sum of two or more numbers, in an embodiment.

FIG. 8 is a flowchart depicting a process for stochastically rounding a signed sum of two or more numbers, in an embodiment. At step 805, two or more input numbers are received for summation. At step 810, a full addition (including carry propagations) of the two or more numbers is performed to generate an intermediate signed sum. Based on the most significant bit, the sign of the intermediate sum is determined at step 815.

If the intermediate sum is negative, as indicated by the most significant bit being set, then at step 820, a random number is converted to a negative random number. The random number may be converted based on negating all its bits or by negating only the most significant bit of the random number. If the intermediate sum is positive, as indicated by the most significant bit being clear, then the random number is used without any conversion.

At step 825, the random number is received, and at step 830, an addition is performed of the random number with the intermediate sum generated at step 810. At step 830, the full sum is generated.

At step 835, a number of most significant bits of the full sum output are selected as stochastically rounded result of the summation of the two or more numbers. The number of significant bits depends on the number of bits used for the random number input.

What is claimed is:

1. A stochastic rounding circuit comprising:
   carry-save adder (CSA) logic having three or more CSA inputs, a CSA sum output and a CSA carry output, wherein a random number value is presented at a particular CSA input from the three or more CSA inputs;
   adder logic having at least a plurality of adder inputs and a sum output;
   wherein the CSA carry output of the CSA logic is coupled with a first input of the plurality of adder inputs of the adder logic, and the CSA sum output of the CSA logic is coupled with a second input of the plurality of adder inputs of the adder logic;
   wherein a particular number of most significant bits of the sum output of the adder logic represent a stochastically rounded sum of at least two CSA inputs, other than the particular CSA input, from the three or more CSA inputs of the CSA logic.

2. The circuit of claim 1, wherein the three or more CSA inputs includes an accumulated input and a non-accumulated input, wherein the accumulated input has more bit-width than the non-accumulated input.

3. The circuit of claim 2, wherein at least one bit output of the CSA sum output is coupled to at least one bit input of the accumulated input.

4. The circuit of claim 2, wherein at least one bit input of the first input of the adder inputs of the plurality of adder logic is set to zero.

5. The circuit of claim 1, wherein the three or more CSA inputs includes an accumulated input and a non-accumulated input, wherein the non-accumulated input and the accumulated input has more bit-width than the particular CSA input.

6. The circuit of claim 2, further comprising:
   a CSA component logic of the CSA logic to determine a carry bit output of the CSA carry output and to determine a sum bit output of the CSA sum output;
   wherein the CSA logic excludes a random-number bit input of the particular CSA input.

7. The circuit of claim 1, further comprising:
   a CSA carry register;
   a CSA sum register;
   wherein the CSA carry output is coupled to the first input of the adder logic by: the CSA carry output being coupled to the CSA carry register and the CSA carry register being coupled to the first input;
   wherein the CSA sum output is coupled to the second input of the adder logic by: the CSA sum output being coupled to the CSA carry register and the CSA carry register being coupled to the second input;
   wherein the CSA carry register is coupled to a first CSA input of the three or more CSA inputs and the CSA sum register is coupled to a second CSA input of the three or more CSA inputs.

8. The circuit of claim 7, wherein a third CSA input, of the three or more CSA inputs, is the particular CSA input.

9. The circuit of claim 1, further comprising Wallace Tree adder logic.

10. The circuit of claim 9, further comprising:
    a multiplexer having a multiplexer output coupled to the particular CSA input of a particular CSA adder logic of the Wallace Tree adder logic, wherein at least one input of the multiplexer is a random number and at least another input of the multiplexer is zero;
    wherein a particular CSA carry output of the particular CSA adder logic is the CSA carry output of the CSA logic and is coupled with the first input of the plurality of adder inputs of the adder logic; and
    wherein a particular CSA sum output of the particular CSA adder logic is the CSA sum output of the CSA logic and is coupled with the second input of the plurality of adder inputs of the adder logic.

11. The circuit of claim 1, further comprising a random number logic having a random number logic output coupled to the particular CSA input.

12. The circuit of claim 11, wherein the random number logic comprises at least one of: a linear-feedback shift register or a register storing a random number.

13. A method for stochastic rounding comprising:
    receiving, at carry-save adder logic, a plurality of input values, wherein at least one input value of the plurality of input values is a randomly generated number;
    based at least in part on the randomly generated number, generating a carry output value and a carry-less sum output value;
    receiving, at adder logic, the carry output value and the carry-less sum output value;
    based at least in part on the carry output value and the carry-less sum output value, generating a sum of the plurality of input values;
    selecting a particular number of most significant bits as a stochastically rounded sum of the plurality of input values.

14. The method of claim 13, further comprising
    at an iteration of multiple iterations:
    receiving, at the carry-save adder logic, a particular input value of the plurality of input values,
    based on the particular input value, a previous carry-less sum output value, and a previous carry output value from a previous iteration of the multiple iterations, generating an intermediate carry-less sum output and an intermediate carry output,
    storing the intermediate carry-less sum output and the intermediate carry output for a next iteration of the multiple iterations.

15. The method of claim 13, wherein receiving, at the carry-save adder logic, the plurality of input values comprises:
    receiving each of the plurality of input values at a respective iteration of multiple iterations;
    wherein a last input value of the plurality of input values received at a last iteration of the multiple iterations is the randomly generated number.

16. The method of claim 13, wherein the randomly generated number is received from a linear feedback register.

17. The method of claim 13, wherein the plurality of input values excluding the randomly generated number are output values of another carry-save adder logic.

18. The method of claim 17, wherein receiving, at the carry-save adder logic, the randomly generated number is based on a control input value.

19. A method of stochastic rounding comprising:
generating, at first adder logic, an intermediate sum of a plurality of input values;
based on a most significant bit of the intermediate sum, determining that the intermediate sum is negative;
converting a randomly generated value into a negative randomly generated value;
based on the intermediate sum and the negative randomly generated value, generating, at second adder logic, a sum of the plurality of input values;
selecting a particular number of most significant bits of the sum of the plurality of input values as a stochastically rounded sum of the plurality of input values.

20. The method of claim 19 wherein converting the randomly generated value into the negative randomly generated value is performed at least by setting a most significant bit of the randomly generated value.

21. The method of claim 19 wherein converting the randomly generated value into the negative randomly generated value is performed at least by negating bits of the randomly generated value.

* * * * *